United States Patent
Liu et al.

(10) Patent No.: US 12,017,921 B2
(45) Date of Patent: Jun. 25, 2024

(54) SILICA AEROGEL PREPARATION METHOD AND AEROGEL PREPARED USING SAID METHOD

(71) Applicant: Huafeng (Tianjin) New Material Co., LTD, Tianjin (CN)

(72) Inventors: Wei Liu, Tianjin (CN); Ye Sun, Tianjin (CN); Zhensheng Li, Tianjin (CN); Mengjun Liu, Tianjin (CN)

(73) Assignee: Huafeng (Tianjin) New Material Co., LTD., Tianjin (CN)

( * ) Notice: Subject to any disclaimer, the term of this patent is extended or adjusted under 35 U.S.C. 154(b) by 348 days.

(21) Appl. No.: 17/238,187

(22) Filed: Apr. 22, 2021

(65) Prior Publication Data
US 2021/0246038 A1   Aug. 12, 2021

Related U.S. Application Data

(63) Continuation of application No. PCT/CN2019/094908, filed on Jul. 5, 2019.

(51) Int. Cl.
*C01B 33/158* (2006.01)
*B01J 13/00* (2006.01)
*C01B 33/143* (2006.01)
*C01B 33/159* (2006.01)

(52) U.S. Cl.
CPC ....... *C01B 33/1585* (2013.01); *B01J 13/0091* (2013.01); *C01B 33/1435* (2013.01); *C01B 33/159* (2013.01); *C01P 2006/12* (2013.01); *C01P 2006/37* (2013.01)

(58) Field of Classification Search
CPC ............ C01B 33/1585; C01B 33/1435; C01B 33/159; C01B 33/158; B01J 13/0091; C01P 2006/12; C01P 2006/37
See application file for complete search history.

(56) References Cited

FOREIGN PATENT DOCUMENTS

CN    104745102 A  *  7/2015
CN    105440748 A  *  3/2016

OTHER PUBLICATIONS

Horiuchi et al.(Solidification of "Cement-Glass", Journal of Nuclear Science and Technology, 1989) (Year: 1989).*
Lukasiewicz (Spray-Drying Ceramic Powders, Journal of the American Chemical Society, 1989 (Year: 1989).*
Machine translation of CN-104745102-A (Year: 2015).*
Machine translation of CN-105440748-A (Year: 2016).*

* cited by examiner

*Primary Examiner* — Colin W. Slifka
*Assistant Examiner* — Logan Edward Laclair

(57) ABSTRACT

A preparation method for a silica aerogel, comprising the following steps: A) raw material containing a solid silicon source and an alkaline solution is used to produce an aerogel precursor after mixing; and B) the aerogel precursor is dried to obtain a silica aerogel. An improved silica aerogel preparation method, comprising the following steps: A) a cation exchange resin and a silicate solution are used as raw materials and mixed; B) the mixed material is allowed to stand to obtain an aerogel precursor; and C) the aerogel precursor is dried to obtain a silica aerogel.

9 Claims, 8 Drawing Sheets

SILICA AEROGEL PREPARATION METHOD AND AEROGEL PREPARED USING SAID METHOD

CROSS-REFERENCE TO RELATED APPLICATIONS

This application is a national stage application under 35 U.S.C. 111 and claims benefit of international application No. PCT/CN2019/094908 having an international filing date of Jul. 5, 2019.

TECHNICAL FIELD OF THE INVENTION

The present invention relates to the field of aerogel preparation, and in particular, it relates to a method for preparing a silica aerogel and an aerogel prepared using said method.

BACKGROUND OF THE INVENTION

In general, an aerogel is obtained by elimination of liquid in a hydrogel structure by a certain method, with no nanoscale pores destroyed. A porous media with three-dimensional network structure is obtained, with characteristics of small density, large specific surface area and nanoscale pores. Silica aerogel solid, containing 99% of gas, shows blue under Rayleigh scattering, thus, it is also known as blue smoke, as it looks like a cloud. While an aerogel is also sometimes called "solid smoke" or "frozen smoke" because of its translucent color and ultra light weight. Aerogels can be applied in various fields, such as aviation, building insulation, acoustic delay, environmental protection and absorption.

Silica aerogels are a common type of aerogel. $SiO_2$ aerogel is a lightweight nanoporous amorphous solid material with excellent thermal protection and heat insulation properties. It has high porosity, large specific surface area, low density, and low thermal conductivity at room temperature. Due to these characteristics, aerogel materials have robust potential in various applications in thermology, acoustics, optics, microelectronics and particle detection. The preparation of aerogels are usually consisted of sol-gel process and supercritical drying treatment. In the sol-gel process, nanoclusters with different structures are formed in the solution by controlling reaction conditions of hydrolysis and condensation. The clusters adhere to each other, so as to form a gel. Around the solid backbone of the gel is fulfilled with liquid reagents remaining after chemical reactions. The formation mechanism of an aerogel is that, during drying, the earlier-formed gel is not only dehydrated, but also ensured that the gel does not collapse, so that the air is allowed to enter the network in the gel to replace those water in the original gel.

At present, according to the methods for preparing aerogels in the art using supercritical drying technology, tetramethoxy-silicane and tetraethyl orthosilicate are usually used as a silica source for preparing silica aerogels. These organic silicon sources require to be hydrolyzed so as to produce silicic acid. During the process of hydrolysis, a large amount of volatile organic compounds will be produced, and a large amount of volatile organic compounds will be emitted during mixing and drying. There is also another process in the art, in which sodium silicate solution is used as a silicon source. A large amount of sodium silicate is used as a raw material, resulting in an excess amount of sodium ions in intermediate products. If the excessive sodium ions enter the final product, the product causes corrosion of the metal. To guarantee the quality of the product, sodium ions need to be removed, but the cleaning process of sodium ions usually produces a lot of waste water. In the art, dimethylchlorosilane is mainly selected as a raw material for the precursor. The hydrolysis of the raw material itself produces a large amount of chloride ions, which are also highly corrosive. If the excess chloride ions remain in the product, the product quality may be affected. In order to remove chloride ion, a large amount of liquid is needed for cleaning, so a large amount of chlorine-containing waste liquid is produced.

SUMMARY OF THE INVENTION

Related Terms

Silicon source: "silicon source" as used herein refers to a substance or material providing silica element for the production of a silica aerogel.

Solid silicon source: "solid silicon source" as used herein refers to a solid silicon-containing compound such as white carbon black, silica powder, diatomite, or a mixture thereof, which has a large reaction contact surface area and can form silicate ions under the action of alkali ions.

Alkaline solution: "alkaline solution" as used herein includes an alkaline aqueous solution (such as a sodium hydroxide solution, a sodium silicate solution), an alkaline organic solution (for example, a solution of sodium ethoxide dissolved in ethanol), and a mixture thereof.

Basic Embodiment A

In the prior art, a method for preparing silica aerogel using an organic silicon source (such as tetramethyl orthosilicate and tetraethyl orthosilicate) as raw material, a large amount of organic matters is used, so a large amount of organic waste gas is produced during mixing, stirring and drying processes. In the process in the art, sodium silicate solution is used as a silicon source. A large amount of sodium silicate is used as a raw material, resulting in an excess amount of sodium ions in intermediate products. If the excessive sodium ions enter the final product, it will make the product represent corrosion to the metal. Sodium ions need to be removed to guarantee the quality of the product, but the cleaning process of sodium ions usually produces a lot of waste water. The problem that a large amount of waste water is produced also occurs in the preparation of a silica aerogel using other silicates as a silicon source.

In order to solve the problem that a large amount of organic waste gas or waste water is produced, the present invention provides a technical scheme in which a solid silicon source is used as raw material for providing silicon element, which is mixed with alkaline solution under certain conditions. After mixing, an aerogel precursor is obtained. After the precursor is dried, the aerogel product is obtained. The specific steps are as follows:

A. Mixing a solid silicon source with a alkaline solution under certain conditions, so that an aerogel precursor is obtained.

B. Drying the precursor so as to obtain an aerogel product.

The solid silicon source of the present invention can afford silicate ions under the action of alkali ions. The silicate ion is very unstable. When they encounter hydrogen ions, they may rapidly combine with hydrogen ions to form silicic acid. A gel is formed from silicic acid through gel reaction under certain controlled conditions. Due to the solid silicon source of the present invention, the technical scheme of the present invention can provide a very large reaction contact surface area, improve the chance of capturing alkali ions, and accelerate the formation of silicate ions; while the solid silicon source is a porous medium, it is a multi-molecular coagulant having an enhanced adsorption capacity, so the formed silicate ions are easy to be captured by the porous medium and adsorbed on the surface of the porous medium. The gelation reaction is mainly interfacial reaction, such as a gelation reaction at a solid-liquid interface. The gel obtained by gelation is dried (a variety of drying methods can be used) to form a silicon aerogel. That is, the solid silicon source plays a role of porous silica solid medium, a part of it serves as a reactant to participate in the reaction, and the other part is used as seed to adsorb the fresh formed silica. Thus, there are some porous medium with a large pore size forming a hydrogel with a small pore size.

Compared with those methods for preparing silica aerogel using an organic silicon source (such as tetramethoxysilicane and tetraethyl orthosilicate) as raw material, the present Embodiment A reduces the addition of organic matters in raw material, thereby avoiding the production of a large amount of organic waste gas in mixing, stirring and drying processes.

Compared with those methods for preparing silica aerogel using an inorganic silicon source as raw material, a solid silicon source is utilized, thereby the risk of an excess amount of sodium ion in the product is avoided, so sodium ion cleaning is eliminated, and the production of large amount of sodium containing waste water is avoided.

In addition, as the gelation reaction in the technical Embodiment A mainly happens at the solid-liquid interface, the reaction speed can be controlled by controlling the solid-liquid ratio, so that increased specific surface area and reduced thermal conductivity of the product can be obtained with optimal controls, so as to enhance the overall product quality.

Embodiment B: Improvement of Silicon Phosphate Regulators

Embodiment B is an improved Embodiment of basic Embodiment A. The raw materials include silicon phosphate, sodium silicate and water besides the solid silicon source as main raw materials. The steps of Embodiment B are as follows:
  A. Mixing the well-mixed silicon phosphate, sodium silicate and water with gel nucleus particles in a sealing condition, so as to obtain a precursor.
  B. Drying the precursor so as to obtain an aerogel product.

In alternative embodiments, Silicon phosphate in Embodiment B may be replaced by silicon polyphosphate or a mixture of silicon phosphate and silicon polyphosphate.

Embodiment B can also reduce waste liquid. The reaction of solid silicon source, sodium silicate and silicon phosphate in aqueous solution produces the required silicic acid. The hydrolysis of silicon phosphate in water produces silicon phosphate and silicic acid. Phosphoric acid may generate hydrogen ions in water, while there are a lot of silicate particles in the solution. Hydrogen ions and silicate particles in the solution can also produce silicic acid. In this process, there is no more solutions introduced, while silicon elements contained in raw materials may be converted into final product-silicic acid. Compared with the method of preparing a silica aerogel using sodium silicate as a silicon source in the prior art, there is no step of removing silicate from the solution in Embodiment B, thereby the production of a large amount of waste liquid is avoided.

The gel nucleus particles include one or two of white carbon black and silica powder, playing the roles of the gel nucleus particle and the solid silicon source. White carbon black and silica powder, both mainly contain silicon oxide and both are porous structure. They react with sodium ion to produce sodium silicate, and sodium silicate continues to hydrolyze to obtain silicic acid. After the precursor is dried, silicic acid is condensed and dehydrated into silica, while fumed silica and silica powder as gel nucleus particles adsorb water and dehydrates to produce silica, so as to obtain a silica aerogel with porous structure. This process avoids the production of waste liquid.

In Embodiment B, the mass ratio of silicon phosphate to sodium silicate is 1-100:100; and the weight ratio of gel nucleus particles to sodium silicate is 1-50:100. The mass ratio of silicon phosphate to sodium silicate is 5-50:100. The mass ratio of silicon phosphate to sodium silicate is 10-30:100. Silica aerogel prepared under this mass ratio has a larger specific surface area and a smaller thermal conductivity.

In the Embodiment B, the weight ratio of the gel nucleus particles to sodium silicate is 5-20:100. Silica aerogel prepared under this ratio has a larger specific surface area and a smaller thermal conductivity.

Further, in the Embodiment B, silica aerogel can be obtained by atomization drying or natural drying. Among them, the result of spray drying is powdered silica aerogel, and the drying temperature may be from 200-500° C. Silica aerogel with good quality can be obtained by drying in this temperature.

The precursor may also be directly applied to a solid surface for natural drying, when it is being used. The initial gelation time is 40-50 h at room temperature, and the total drying time is 6-7 days.

Silica aerogel prepared by the above method has a porous structure. This porous structure makes the silica aerogel has a larger specific surface area and a smaller thermal conductivity.

Embodiment C: Improvement of Acidity Regulators

Embodiment C is an improved Embodiment of basic Embodiment A. In the case of using solid silicon source as the main raw material, other raw materials include an acidity regulator and organic solvents with a low boiling point. The steps of Embodiment C are as follows:
  A. Reacting an alkaline silicate aqueous solution with a solid silicon source at 35-100° C. The silicate comprises, but is not limited to, related metal silicates, such as sodium silicate, potassium silicate, and lithium silicate.
  B. After cooling the material obtained in step A to room temperature, adding acidic substances to adjust the pH value to 6.5-7.5, and reacting, so as to obtain a precursor. Suitable acidic substances comprise one of hydrochloric acid, sulfuric acid, phosphoric acid, nitric acid, acetic acid, citric acid and benzoic acid.
  C. After the gelation of a precursor, replacing the water in the precursor using a low-boiling-point organic solvent. The organic solvent comprises one of ethanol, pentane, dichloromethane, and methanol.
  D. Drying the precursor after organic solvent substitution, so as to obtain an aerogel product.

The Embodiment C also can reduce waste liquid. The solid silicon source reacts in an alkaline silicate solution to produce the required product silicic acid, where the silicate serves as a catalyst. The hydrogen ions provided by acidic substances combine with silicate ions to form the required silicate. Compared with those methods for preparing silica aerogel using sodium silicate as silicon source, the Embodiment C reduces the use of sodium silicate solution, thereby the use of liquid in consequent cleaning of sodium ions is reduced, so the production of waste liquid is avoided.

The alkaline solution of silicate substances is reacted with the solid silicon source at 35-100° C., and cooled down to room temperature after the reaction, then acidic substances are added to adjust the pH value to 6.5-7.5, so as to obtain a precursor. Wherein the silicate substances comprise silicic acid or silicates. For example, silicates may be sodium silicate, potassium silicate, and calcium silicate, etc. Wherein the silicate solution is an aqueous solution of silicate, and silicate is dehydrated in water, resulting in an alkaline solution. Wherein the silicic acid solution is obtained by dissolving silicic acid in an acid solution.

The solution of silicate substances is an alkaline solution. In Embodiment C, the solution of silicate substances has a pH value of 10-14. The silica source dissolves and reacts to produce silicic acid at a temperature of 35-100° C. and under alkaline conditions. Acidic substances are added after the reaction is cooled down to room temperature. The acidic substances provide hydrogen ions. The ions of silicate substances are substituted by hydrogen ions to form silicic acid, and consequently to obtain a precursor. After the gelation of a precursor, the water in the precursor is replaced by an organic solvent with a low boiling point, then drying is performed to remove the organic solvent, leaving a porous structure in the precursor, so that a silica aerogel with high porosity and large specific surface area is obtained.

In Embodiment C, the drying is a microwave drying. When microwave enters the gel and absorbed by the gel, its energy is converted into heat energy in the dielectrics of the material. The heat transfer direction of the microwave drying is the same as the diffusion direction of the organic solvent. The heat can be evenly permeated, showing a uniform drying with a high drying rate.

In Embodiment C, the suitable silica source is one of white carbon black and silica powder, and a combination thereof. The main components of fumed silica and silica powder are silica and both they have a porous structure. Fumed silica and silica powder have particles in nanoscale. They can be dissolved and reacted into silicic acid at a temperature of 35-100° C. under alkaline conditions. In some embodiment, the reaction temperature of a solution of silicate substances with a silica source is 50-90° C. The reaction of a solution of silicate substances with a silica source occurs in this temperature allows the silica source to dissolve better and react completely to produce silicic acid.

Further, in Embodiment C, acidic substances may comprise organic acids and/or inorganic acids. That is, acidic substances may be an organic acid, and may also be an inorganic acid, and may also be a mixture of organic acid and inorganic acid. Wherein The inorganic acid comprises one of hydrochloric acid, sulfuric acid, phosphoric acid, and nitric acid. The organic acid comprises one of acetic acid, citric acid and benzoic acid.

In addition, in Embodiment C, the organic solvent with a low boiling point comprises one of ethanol, pentane, dichloromethane and methanol.

The low-boiling-point organic solvent has a low boiling point, so the organic solvent may be removed at low temperature when drying is performed, so as to achieve better drying effect.

A silica aerogel is prepared by the above method. The silica aerogel prepared by this method has a porous structure. Measurement results show that the silica aerogel has a large specific surface area and a small thermal conductivity.

Embodiment D: Modification of Manic Ester

Embodiment D is an improved Embodiment of basic embodiment A. In the case of using solid silicon source as the main raw material, sodium silicate and organic ester may also be incorporated into raw materials, so as to produce a modified aerogel. The steps of Embodiment D are as follows:

A. Performing hydrolysis reaction of a mixture of a sodium silicate and a solid silicon source with an organic ester to obtain a precursor.

B. Drying the precursor so as to obtain an aerogel product.

Sodium silicate in embodiment D may be replaced by a silica sol.

The embodiment D can reduce waste liquid. The reaction of solid silicon source in alkaline solution of silicate produces the required product silicic acid. Sodium silicate hydrolyzes with water to produce silicic acid and provide hydroxyl ions, which serve as a catalyst in the reaction. Acids produced in the hydrolysis of an organic ester may generate hydrogen ions in water, while there are a lot of silicate particles in the solution. Hydrogen ions and silicate particles in the solution can also produce required silicic acid. In this process, there is no more solutions introduced, while silicon elements contained in raw materials may be converted into final product. Thus, there is no step of removing silicate from the solution in embodiment B, thereby the production of waste liquid is reduced. Compared with the method of preparing a silica aerogel using sodium silicate as a silicon source in the art, there is no use of the solution of sodium silicate in embodiment D, consequently, the use of liquids in subsequent cleaning of sodium ions is reduced, thereby the production of waste liquid is reduced. Compared with those methods for preparing silica aerogel using an organic silicon source as silicon source, the organic ester in Embodiment D serves as a catalyst, the amount of organic substances is lower, thereby the amount of organic waste gases produced in related steps in the process is reduced.

At the same time, the acid produced in the hydrolysis of organic ester may effectively control the gelation rate. The hydrolysis rate may be controlled by adjusting acidity and basicity. The quality of the product is controllable, so the aerogels with different qualities may be produced as required.

The hydrolysis of organic ester of the present invention may provide hydrogen ions for the reaction, changing the method of directly using acid to perform gelation; and provide alcohol, replacing the low boiling point organic solvent, such as ethanol, to perform solvent replacement. Therefore, the raw material is simple, and the process is simple. The process of this embodiment is simplified into a one-step process instead of the conventional two-step process in which liquid in gel is replaced by organic solvent, thereby the technological process is reduced, the production cycle is reduced, the production efficiency is increased, and the production cost is decreased. In the method for preparing products, the gelation is carried out at room temperature, and drying is performed at a normal pressure, thus the process is simple. The specific method is: performing reaction of the mixture of silicate and solid silicon source with hydrolyzed organic ester, so as to obtain a precursor; drying the precursor to obtain a silica aerogel. In other embodiments, the silicate may be sodium silicate, potassium silicate, calcium silicate, etc, and preferably sodium silicate.

The hydrolysis rate of organic ester can be adjusted by concentration, temperature, acidity and basicity. In the hydrolysis of organic esters, acidity and basicity are adjusted by adding an acid-base indicator, such as ammonium triacetate. A template directing agent, such as alkylbenzene sulfonic acid (or metal salt), and/or a template, such as polyvinyl alcohol, can be added. The total mass percentage of the template directing agent and the directing agent in the hydrolysis reaction system of the organic ester is 0-20%. The acid produced in the hydrolysis of organic ester may effectively control the gelation rate, so that the specific surface area, pore size, structure and morphology of the product are controlled. The hydrolysis rate may be controlled by adjustment. The quality of the product is controllable, so the aerogels with different qualities may be produced as required. The alcohol produced by the hydrolysis of organic ester may replace an organic solvent with a low boiling point instead of the organic solvent, such as ethanol. Therefore, the raw material is simple, and the process is simple.

The organic ester can be any organic ester that can be hydrolyzed. The organic ester comprises, but is not limited to, for example, at least one selected from the following esters: for example, at least one of the organosilicon ester and the organic acid ester according to the type of the ester group. The organosilicon ester and the organic acid ester may be, but is not limited to, for example, at least one selected from conventional esters with R group comprising only carbon chain structure and aromatic esters with R group comprising aryl group, etc. The organic acid ester of the present invention refers to conventional ester compounds with an ester group produced by the condensation of carboxyl and "—C—OH" alcohol hydroxyl, such as monobasic acid ester, dibasic acid ester and other polycarboxylic acid ester classified by the number of hydrogen ion after ionization.

Preferably, the organic ester is a liquid ester with a low molecular weight. The low molecular weight means that the organic ester represents in a liquid state at a normal temperature under a normal pressure. It is convenient for the operation of hydrolysis reaction. An ester with a high molecular weight is commonly represents as a solid. Its preparation process is complicated.

Further, the organic ester is preferably at least one selected from organosilicon ester, monobasic acid ester and dibasic acid ester. For example, the organic ester comprises, but is not limited to, for example, at least one selected from the following: ethyl acetate, methyl acetate, ethyl formate, methyl malonate, ethyl malonate, methyl succinate, ethyl succinate, trimethylsilyl acetate, trimethylsilyl bromoacetate, trimethylsilyl methacrylate, trimethylsilyl isobutyrate, trimethylsilyl propionate, trimethylsilyl isothionate, etc.

A template directing agent, such as alkylbenzene sulfonic acid (or metal salt), serves a function of wetting, and enhancing the chance of surface contacting. White carbon black particles serve as the carrier and the gel carrier for local reactions. The polyhydroxy group of polyvinyl alcohol serves as a template to guide silicic acid to form a cyclic stereostructure.

In Embodiment D, the white carbon black is hydrophilic and/or hydrophobic. For example, hydrophobic white carbon black may be solely used, or the mixture of hydrophobic fumed silica and hydrophilic fumed silica may be used, or hydrophilic fumed silica may be solely used. When there are more hydrophilic fumed silica, especially when there are much more hydrophilic fumed silica, an organosilicon hydrophobic agent may be added to achieve the purpose of hydrophobicity, so that the fumed silica can be soluble in organic ester. Consequently, the particles are allowed to be rearranged to produce porous media, resulting in a better gelation effect.

In Embodiment D, the amount of sodium silicate is low. The hydrolysis of sodium silicate and water produces silicic acid, and provides hydrogen ions, which has catalytic effect on the reaction.

Optionally, the mass ratio of sodium silicate to white carbon black is 18-38:40-60. The mass ratio of white carbon black to organic ester is 40-60:90-110. The mass ratio of white carbon black to water in the hydrolysis reaction is 40-60:90-110.

Further, in the embodiment in Embodiment D, the mass ratio of sodium silicate, white carbon black, organic esters and water in the hydrolysis reaction is 18-38:40-60:90-110:90-110. Preferably, it may be 23-33:45-55:95-105:95-105. More preferably, it is 28:50:100:100.

In the embodiment in Embodiment D, hydrolysis is performed with a continuous stirring under an airtight condition, with a reaction temperature of 50-70° C. and a reaction time of 3-5 h. The hydrolysis reaction is performed in a closed container to prevent the volatilization of organic matter. The reaction temperature optionally is any one or in the range between any two selected from 50° C., 52° C., 54° C., 56° C., 58° C., 60° C., 62° C., 64° C., 66° C., 68° C., 70° C.; the reaction time optionally is any one or in the range between any two selected from 3.5 h, 4 h, 4.5 h, 5 h, and the hydrolysis results are good.

Optionally, microwave-hot-air drying is used for drying, with a drying temperature of 160-200° C., a drying time of 40-80 min; after drying, the water content of the product is lower than 0.01%. The drying temperature is optionally any one or in the range between any two selected from 160° C., 165° C., 170° C., 175° C., 180° C., 185° C., 190° C., 195° C., 200° C.; the drying time is optionally any one or in the range between any two selected from 40 min, 45 min, 50 min, 55 min, 60 min, 65 min, 70 min, 75 min, 80 min, so that a sufficient drying is guaranteed, resulting in the dried product with a good porous structure.

Embodiment E: Improvement of Cation Exchange Resin

Another improved Embodiment of the present invention is that, in addition to solid silicon source, silicon source comprises, but not limited to, related inorganic silicate materials, such as sodium silicate, potassium silicate, lithium silicate; and raw materials further comprise water and cation exchange resins. The process comprises:
  A. Performing ion exchange reaction of silicate solution with an cation exchange resin powder.
  B. aging after the reaction, so as to obtain a precursor.
  C. Drying the precursor so as to obtain a silica aerogel.

In Embodiment E, the silicate may be sodium silicate, potassium silicate, and calcium silicate, etc., preferably, the silicate is sodium silicate.

The cation exchange resin is used for ion exchange reaction with the sodium silicate solution. The ion exchange resin absorbs sodium ions in sodium silicate solution and released hydrogen ions into the solution. The released hydrogen ions substitute sodium ions in sodium silicate solution, so as to produce silicic acid. The cation exchange resin cleans sodium ions and promotes gelation, reduce the production of waste liquids, so it is friendly to environment. The use of ion exchange resin may inhibit sodium ions or metal ions, so the subsequent step of removing cations may be eliminated, and the production of waste liquids is avoided, the product quality is improved, and the corrosion possibility of metal materials is avoided. Compared with the preparation method of silica aerogel using sodium silicate as silicon source in the prior art, the Embodiment E reduces the use of sodium silicate solution, thereby reducing the use of liquid in subsequent cleaning of sodium ion links, thereby reducing the production of waste liquid.

In the Embodiment E, the concentration of the silicate solution is in a range from 0 to saturation state, optionally it is and less than 4.5 mol/L, such as it is any one or in the range between any two selected from 0.1 mol/L, 0.5 mol/L, 1 mol/L, 1.5 mol/L, 2 mol/L, 2.5 mol/L, 3 mol/L, 3.5 mol/L, 4 mol/L, 4.5 mol/L. The mass ratio of sodium silicate to cation exchange resin powder in the sodium silicate solution is and less than 100, such as the mass ratio of sodium silicate to cation exchange resin powder is any one or in the range between any two selected from 1, 10, 20, 30, 40, 50, 60, 70, 80, 90, 100.

Further, the ion exchange reaction is performed under stirring, with the reaction temperature of 25-90° C., and the reaction time of 1.5-2.5 h. For example, in some embodiments of the present invention, the reaction temperature optionally is any one or in the range between any two selected from 25° C., 30° C., 35° C., 40° C., 45° C., 50° C., 55° C., 60° C., 65° C., 70° C., 75° C., 80° C., 85° C., 90° C., 95° C.; and the reaction time optionally is any one or in the range between any two selected from 90 min, 100 min, 110 min, 120 min, 130 min, 140 min, 150 min. When a higher temperature is selected as the reaction temperature, a shorter time should be selected as the reaction time; when a lower temperature is selected as the reaction temperature, a longer time should be selected as the reaction time, its sodium ion shielding and gelation are good.

After ion exchange reaction, filtration is performed on the reaction solution and the filtrate is subjected to acidification and gelation. A precursor is obtained after static aging. Optionally, the time for static aging is 1-7 d, such as the time optionally is any one or in the range between any two selected from 1 d, 2 d, 3 d, 4 d, 5 d, 6 d, 7 d. Then, the precursor is dried. After drying, the silicic acid is condensed with a loss of water to form silica, so as to produce silica aerogel with a pompon-like porous structure, having a larger specific surface area and a smaller thermal conductivity.

In Embodiment E, the drying is any one selected from room-temperature natural drying, microwave drying or high-temperature anaerobic drying, but it is not limited thereto. After drying, the water content of the product is lower than 0.01%.

Room temperature natural drying is to perform natural drying at room temperature. The drying time optionally is 1-28 d, such as the time optionally is any one or in the range between any two selected from 1 d, 4 d, 7 d, 10 d, 14 d, 17 d, 20 d, 23 d, 25 d, 28 d.

The microwave drying is to perform microwave-hot-air drying, optionally, with a drying temperature of 160-200° C., a drying time of 40-80 min. Such as, the drying temperature optionally is any one or in the range between any two selected from 160° C., 165° C., 170° C., 175° C., 180° C., 185° C., 190° C., 195° C., 200° C.; and the drying time optionally is any one or in the range between any two selected from 40 min, 45 min, 50 min, 55 min, 60 min, 65 min, 70 min, 75 min 80 min.

The high temperature anaerobic drying is to perform drying in the atmosphere of nitrogen, argon and other protective gases with a low reactivity. Its high temperature refers to the conditions at 600-800° C., preferably, 650-750° C., more preferably, about 700° C. The drying time optionally is less than 240 min. In some specific embodiment, the drying temperature optionally is any one or in the range between any two selected from 600° C., 620° C., 640° C., 660° C., 680° C., 700° C., 720° C., 740° C., 760° C., 780° C., 800° C.; and the drying time optionally is any one or in the range between any two selected from 120 min, 140 min, 160 min, 180 min, 200 min, 220 min, 240 min.

In the Embodiment E, after ion exchange reaction and before static aging, filtration is performed on the reaction solution and the filtrate is subjected to acidification and gelation, and then the gelation product is subjected to solvent replacement with a low boiling point organic solvent.

Optionally, the low boiling point organic solvent comprises at least one selected from ethanol, pentane, ether, acetone and dichloromethane. More preferably, ethanol and/or pentane is used. The water in the product from acidification and gelation is replaced by an organic solvent with a low boiling point, then drying is performed to evaporate the organic solvent, leaving a porous structure in the precursor, so that a silica aerogel with high porosity and low thermal conductivity is obtained. The replacement is performed at about 25° C. for about 30 h, it is convenient for replacing water sufficiently.

After solvent substitution and before static aging, optionally, silazane is used for modification. The resistance to high temperature of aerogels obtained after modification treatment is greatly enhanced, the temperature can be up to 1600° C.

In some specific embodiments, the silazanes comprise at least one selected from hexamethyldisilazane, azido trimethylsilane and hexamethylcyclotrisiloxane, but it is not limited thereto. The amount ratio of nitrosilane to sodium silicate of the sodium silicate solution is less than 1, the reaction temperature for surface treatment is 500-800° C., and the reaction time for surface treatment is 1-60 min. For example, the mass ratio of nitrosilane to sodium silicate is any one or in the range between any two selected from 0.1, 0.2, 0.3, 0.4, 0.5, 0.6, 0.7, 0.8, 0.9, 1; the reaction temperature optionally is any one or in the range between any two selected from 500° C., 550° C., 600° C., 650° C., 700° C., 750° C., 800° C., and the reaction time optionally is any one or in the range between any two selected from 1 min, 5 min, 10 min, 20 min, 30 min, 40 min, 50 min, 60 min. When a higher temperature is selected as the reaction temperature, a shorter time should appropriately be selected as the reaction time; when a lower temperature is selected as the reaction temperature, a longer time should appropriately be selected as the reaction time, so that a good surface treatment is guaranteed, thus, the temperature resistance of the aerogel after modification treatment reaches 900-1600° C.

In the preparation method of Embodiment E, gelation is performed at room temperature, and drying is performed at a normal pressure. The preparation is simple. The cation exchange resin cleans sodium ions and promotes gelation, avoiding the production of waste liquids.

The above basic Embodiment and improved Embodiments are friendly to environment, simple, and have a low cost, and the prepared silica aerogels have a larger specific surface area and a smaller thermal conductivity, etc.

DETAIL DESCRIPTION OF THE INVENTION

Example 1

Figure 1:
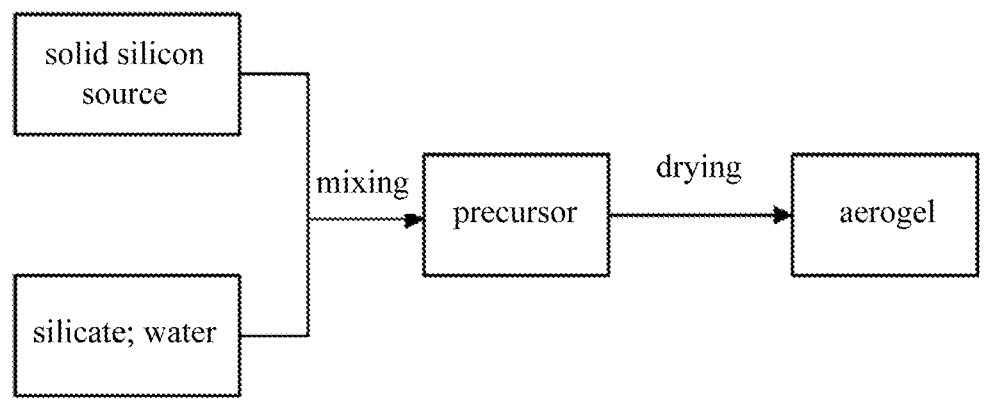
FIG. 1 Flow diagram for the basic Embodiment.
Figure 2:
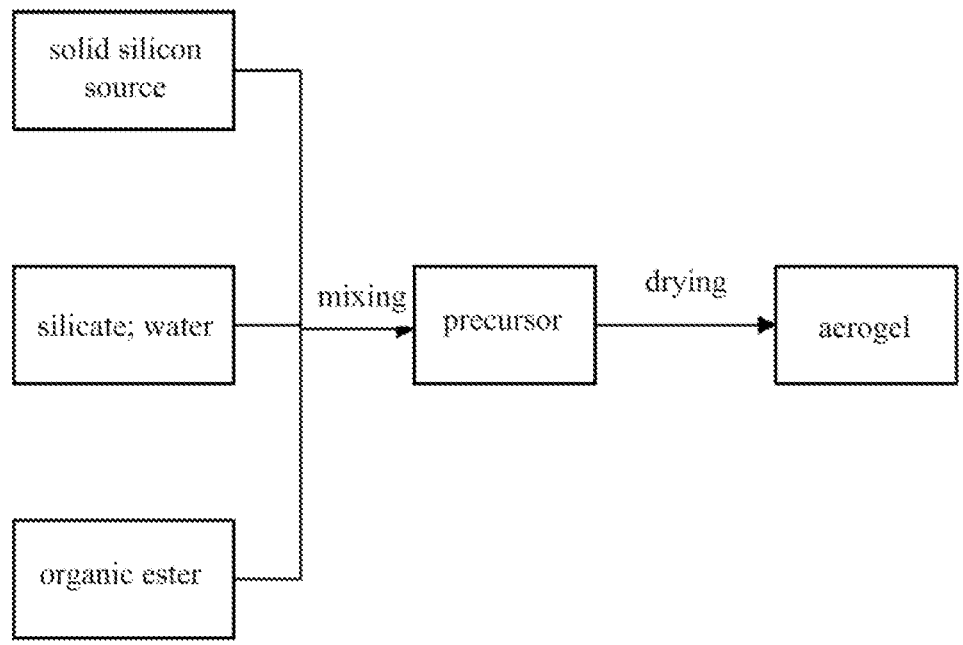
FIG. 2 Flow diagram for the improved Embodiment 1.
Figure 3:
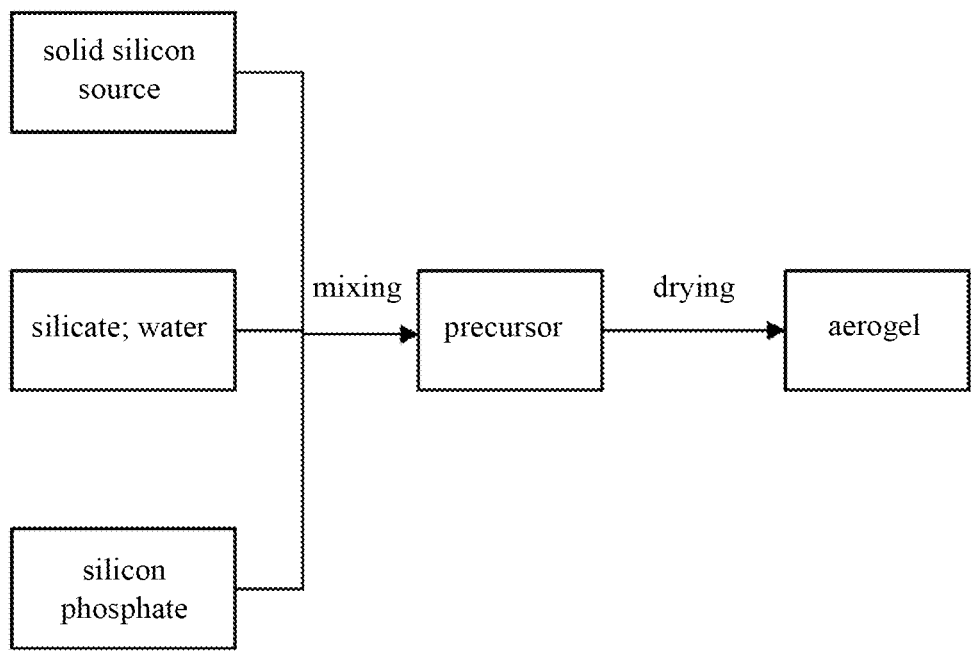
FIG. 3 Flow diagram for the improved Embodiment 2.
Figure 4:
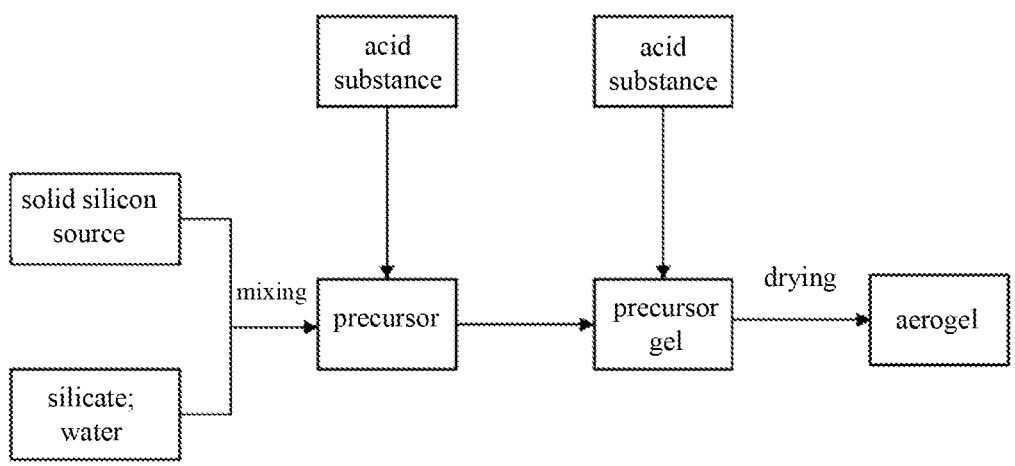
FIG. 4 Flow diagram for the improved Embodiment 3.
Figure 5:
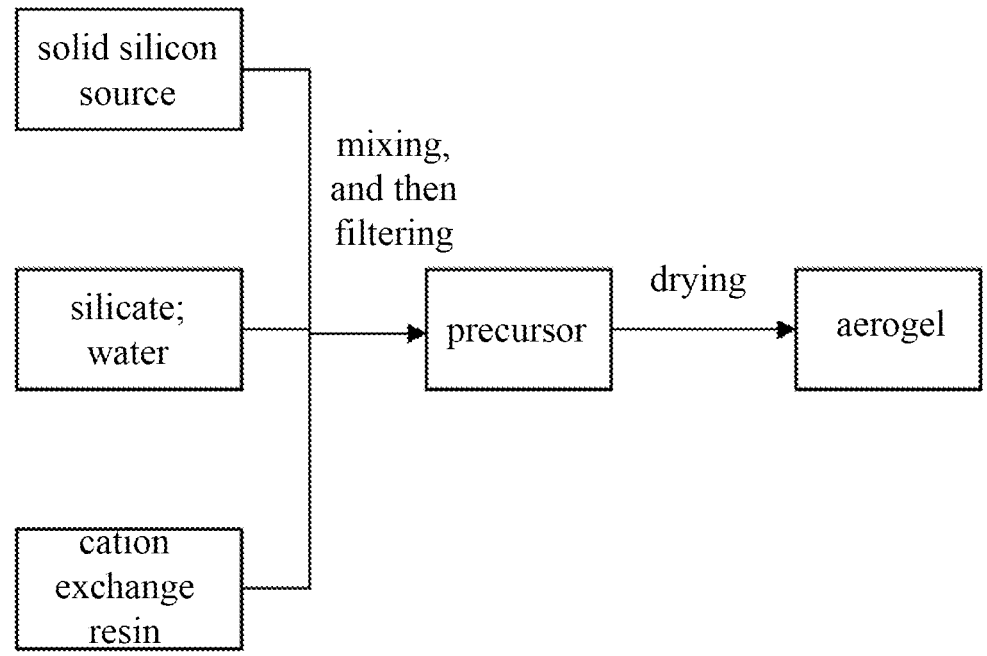
FIG. 5 Flow diagram for a preferable Embodiment of the improved Embodiment 4.
Figure 6:
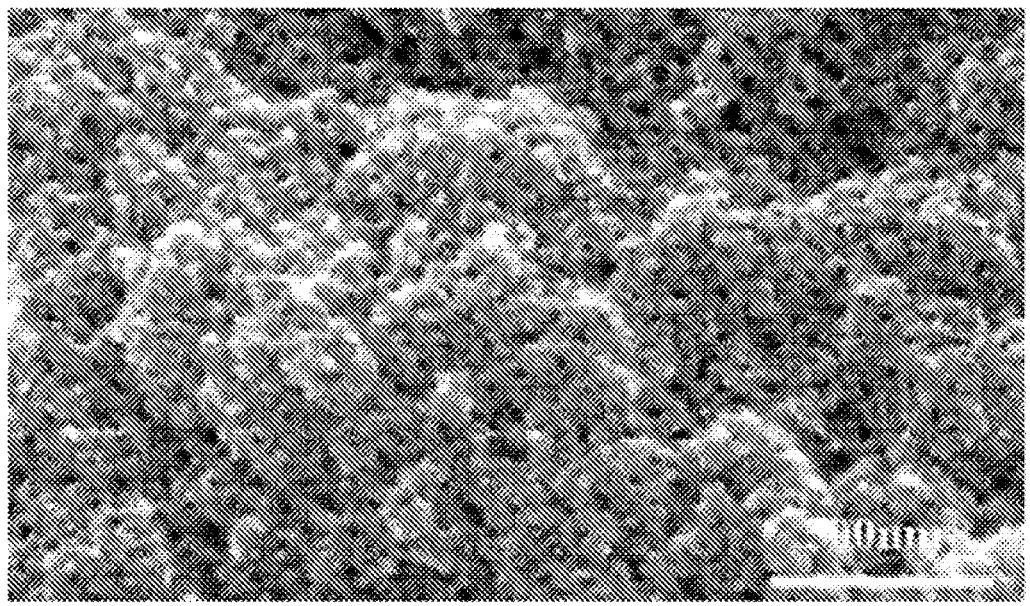
FIG. 6 SEM photograph of the silica aerogel in example 7.
Figure 7:
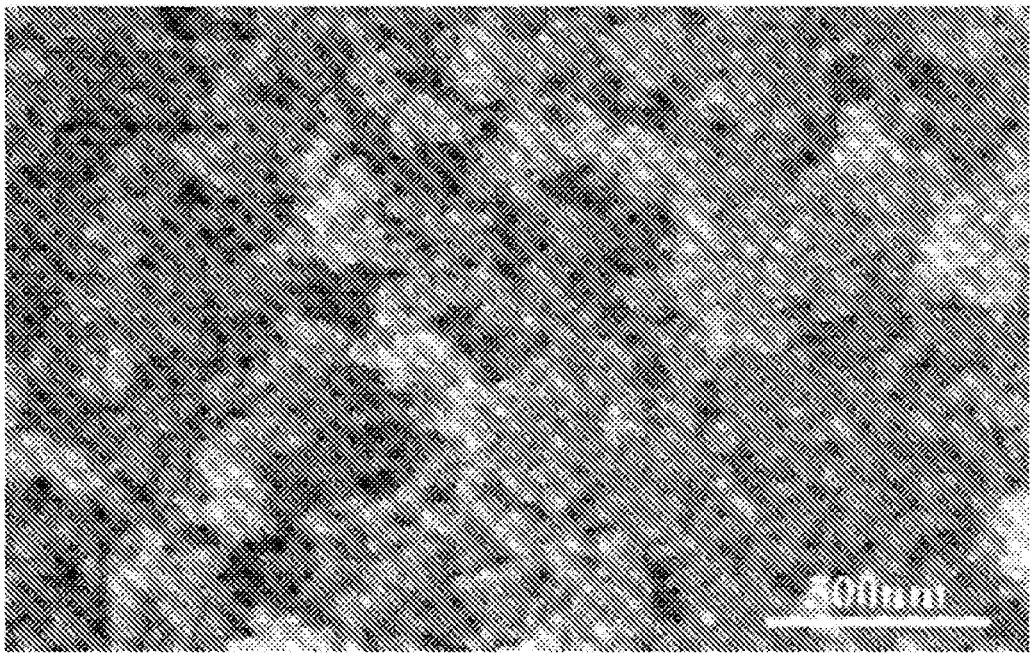
FIG. 7 SEM photograph of the silica aerogel in example 8.
Figure 8:
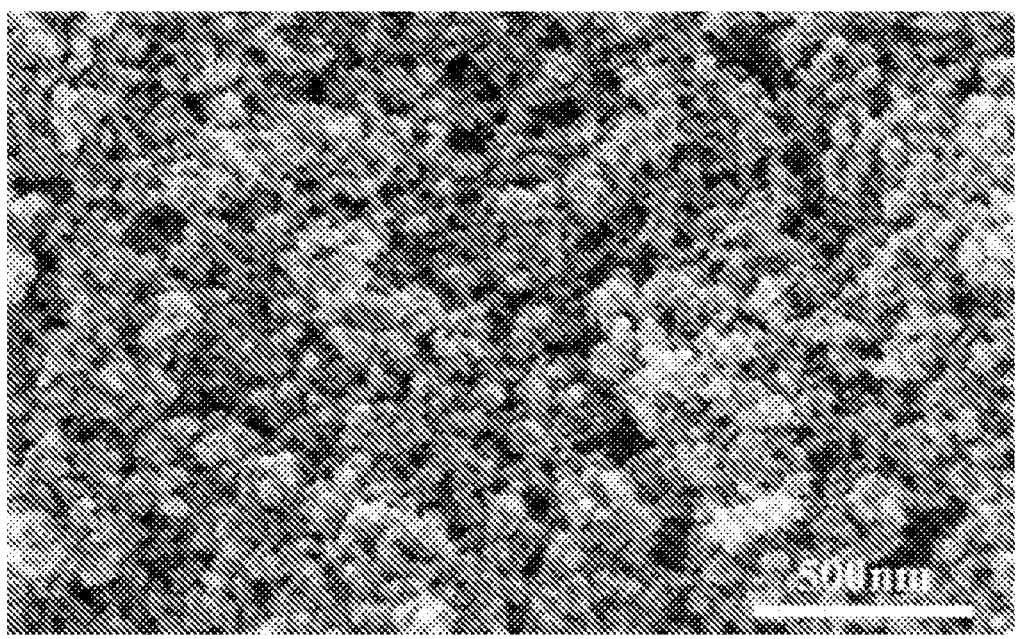
FIG. 8 SEM photograph of the silica aerogel in example 9.

28 g of sodium silicate and 50 g of white carbon black modified by methyl methacrylate were evenly mixed. 100 g of ethyl acetate and 100 g of water were added to the mixture. The reaction was carried out at a reaction temperature of 60° C. with continuous stirring for 4 h in a closed container, so as to obtain a precursor.

The precursor was dried at a drying temperature of 180° C. for 60 min by microwave-hot-air drying, so as to obtain an aerogel powder with a water content lower than 0.01%.

Example 2

18 g of sodium silicate and 40 g of white carbon black modified by methyl methacrylate were evenly mixed. 90 g of ethyl acetate and 90 g of water were added to the mixture. The reaction was carried out at a reaction temperature of 50° C. with continuous stirring for 5 h in a closed container, so as to obtain a precursor.

The precursor was dried at a drying temperature of 200° C. for 40 min using microwave-hot-air drying, so as to obtain an aerogel powder with a water content lower than 0.01%.

Example 3

23 g of sodium silicate and 45 g of white carbon black modified by methyl methacrylate were evenly mixed. 95 g of ethyl acetate and 95 g of water were added to the mixture. The reaction was carried out at a reaction temperature of 55° C. with continuous stirring for 4.5 h in a closed container, so as to obtain a precursor.

The precursor was dried at a drying temperature of 190° C. for 50 min using microwave-hot-air drying, so as to obtain an aerogel powder with a water content lower than 0.01%.

Example 4

In an airtight container, 100 g of sodium silicate and 5 g of silicon phosphate were evenly mixed, and then dissolved in 100 L of deionized water, so as to obtain a system A. 10 g of nanoscale white carbon black was added into the system A to produce a precursor. The precursor was atomized and dried at a temperature of 500° C., so that silica aerogel powders were obtained after drying.

Example 5

In a closed container, 100 g of sodium silicate and 20 g of silicon phosphate were evenly mixed, and then dissolved in 100 mL of deionized water, so as to obtain system A. 16 g of nanoscale white carbon black and 4 g of silica powder were added into the system A to produce a precursor. The precursor was atomized and dried at a temperature of 300° C., so that silica aerogel powders were obtained after drying.

Example 6

In a closed condition, 100 g of sodium silicate and 10 g of silicon phosphate were evenly mixed, and then dissolved in 100 mL of deionized water, so as to obtain system A. 15 g of silica powder were added into the system A to produce a precursor. The precursor was atomized and dried at a temperature of 250° C., so that silica aerogel powders were obtained after drying.

Example 7

The sodium silicate solution with pH value of 11.3 was mixed with silica powder, stirred at a temperature of 35° C., and kept at this temperature under continuous stirring for 2 h. Consequently, the reaction was cooled to room temperature, and acetic acid was slowly added. The pH in the gelation process was controlled at 6.8, so that an aerogel precursor was obtained. The aerogel precursor was mixed with methane, and the water in the precursor was replaced by methane. Then the silica aerogel was dried using microwave drying, and the evaporated methane was cooled and recycled.

Example 8

The sodium silicate solution with pH value of 12 was mixed with fine silica powder, stirred at a temperature of 90° C., and kept at this temperature with continuous stirring for 2 h. Consequently, the reaction was cooled to room temperature, and citric acid was slowly added. The pH in the gelation process was controlled at 6.5, so that an aerogel precursor was obtained. The aerogel precursor was mixed with ethanol, and the water in the precursor was replaced by ethanol. Then the silica aerogel was dried using microwave drying, and the evaporated ethanol was cooled and recycled.

Example 9

The sodium silicate solution with pH value of 13.2 was mixed with white carbon black, stirred at a temperature of 65° C., and kept at this temperature under continuous stirring for 2 h. Consequently, the reaction was cooled to room temperature, and citric acid was slowly added. The pH in the gelation process was controlled at 6.7, so that an aerogel precursor was obtained. The aerogel precursor was mixed with dichloromethane, and the water in the precursor was replaced by dichloromethane. Then the silica aerogel was dried by microwave drying, and the evaporated dichloromethane was cooled and recycled. The SEM of the obtained silica aerogel was observed by scanning electron microscope, and its SEM photograph was obtained. It can be seen from the SEM photograph that the distribution solid silica source is uniform, forming a three-dimensional structure with a clear network structure, after recombination with sodium silicate. There are no solid particles with a large particle size in the fine silicon powder, indicating a complete reaction of the solid silica source with sodium silicate, and a three-dimensional porous structure was obtained.

Example 10

2 mol of sodium silicate was added into 1 L of water to prepare sodium silicate solution. A cation exchange resin with a mass of ⅕₀ of sodium silicate was added into the sodium silicate solution. The reaction was carried out at a reaction temperature of 50° C. under a continuous stirring for 2 h. After the ion exchange reaction, filtration was performed and the filtrate was acidified and gelled. Then the ethanol was added for solvent substitution at a temperature of 25° C. for 30 h. Hexamethyldisilazane with a mass of ½ of sodium silicate was added, and the modification was performed at a temperature of 650° C. for 30 min, followed by a static aging of 4 d, so that a precursor was obtained.

The precursor was dried by natural drying at room temperature for 14 d, so as to obtain an aerogel powder with a water content lower than 0.01%.

An aerogel prepared by the above method.

Example 11

3 mol of sodium silicate was added into IL of water to prepare sodium silicate solution. A cation exchange resin with a mass of ⅟₇₀ of sodium silicate was added into the sodium silicate solution. The reaction was carried out at a reaction temperature of 50° C. under a continuous stirring for 2 h. After the ion exchange reaction, filtration was performed and the filtrate was subjected to acidification and gelatinization. Then the ethanol was added for solvent substitution at a temperature of 25° C. for 30 h. Hexamethyldisilazane with a mass of ⅓ of sodium silicate was added, and the modification was performed at a temperature of 650° C. for 30 min, followed by a static aging of 4 d, so that a precursor was obtained.

The precursor was dried by natural drying at room temperature for 14 d, so as to obtain an aerogel powder with a water content lower than 0.01%.

Example 12

1 mol of sodium silicate was added into IL of water to prepare sodium silicate solution. A cation exchange resin with a mass of ⅟₃₀ of sodium silicate was added into the sodium silicate solution. The reaction was carried out at a reaction temperature of 50° C. under a continuous stirring for 2 h. After the ion exchange reaction, filtration was performed and the filtrate was subjected to acidification and gelatinization. Then the ethanol was added for solvent substitution at a temperature of 25° C. for 30 h. Hexamethyldiazosilane with a mass of ¼ of sodium silicate was added, and the modification was performed at a temperature of 650° C. for 30 min, followed by a static aging of 4 d, so that a precursor was obtained.

The precursor was dried by natural drying at room temperature for 14 d, so as to obtain an aerogel powder with a water content lower than 0.01%.

Example 13

In a closed condition, 100 g of sodium silicate and log of silicon phosphate were evenly mixed, and then dissolved in 150 mL of deionized water, so as to obtain system A. 5 g of silica powder were added into the system A to produce a precursor. The precursor was atomized and dried at a temperature of 250° C., so that silica aerogel powders were obtained after drying.

Example 14

In a closed condition, 100 g of sodium silicate and 15 g of silicon phosphate were evenly mixed, and then dissolved in 100 mL of deionized water, so as to obtain system A. 1 g of silica powder were added into the system A to produce a precursor. The precursor was atomized and dried at a temperature of 400° C., so that silica aerogel powders were obtained after drying.

Example 15

In a closed condition, 100 g of sodium silicate and 10 g of silicon phosphate were evenly mixed, and then dissolved in 150 mL of deionized water, so as to obtain system A. 10 g of silica powder and 20 g of nanoscale white carbon black were added into the system A to produce a precursor. The precursor was coated on a solid surface, and dried by natural drying for 7 days, so that a silica aerogel film was obtained.

Example 16

In a closed condition, 100 g of sodium silicate and 5 g of silicon phosphate were evenly mixed, and then dissolved in 150 mL of deionized water, so as to obtain system A. 10 g of silica powder and 20 g of nanoscale white carbon black were added into the system A to produce a precursor. The precursor was coated on a solid surface, and dried by natural drying for 7 days, so that a silica aerogel film was obtained.

Figure 9:
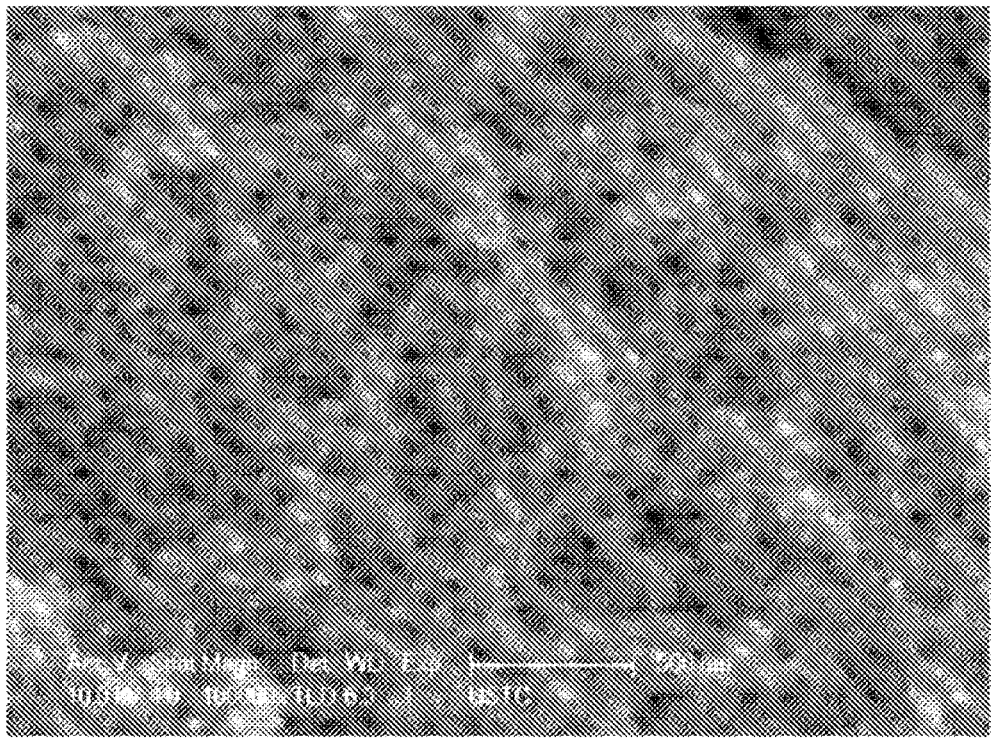
FIG. 9 SEM photograph of the silica aerogel in example 4.
Figure 10:
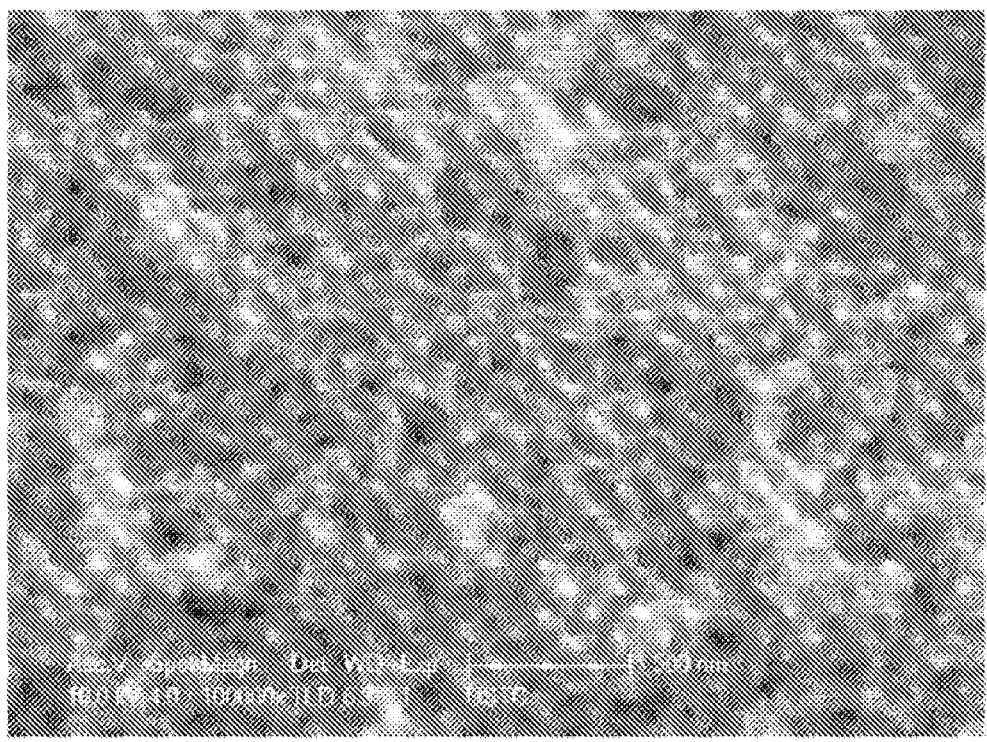
FIG. 10 SEM photograph of the silica aerogel in example 5.
Figure 11:
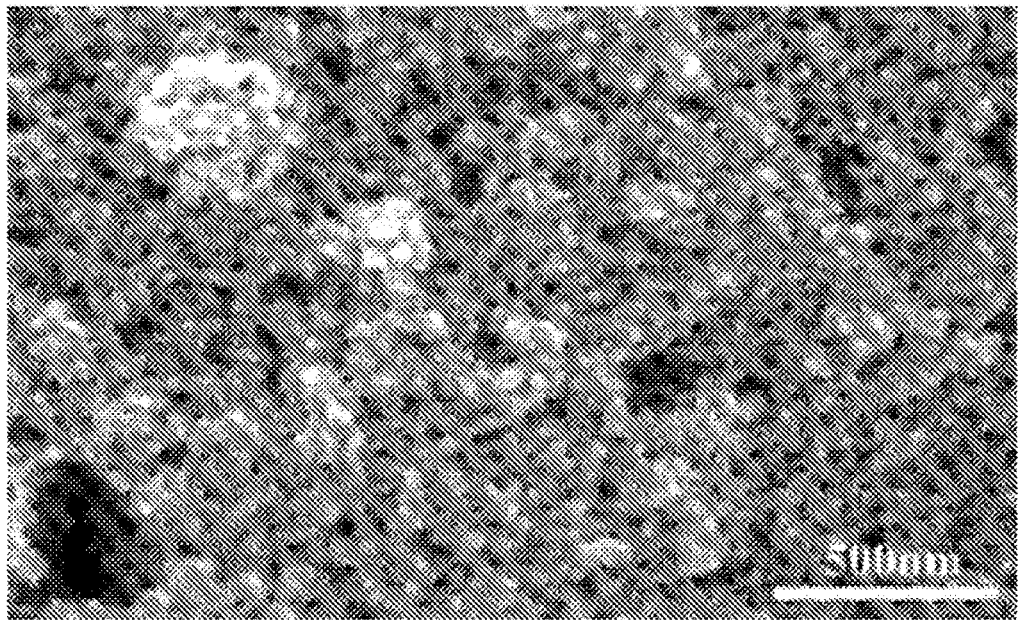
FIG. 11 SEM photograph of the silica aerogel in example 6.
Figure 12:
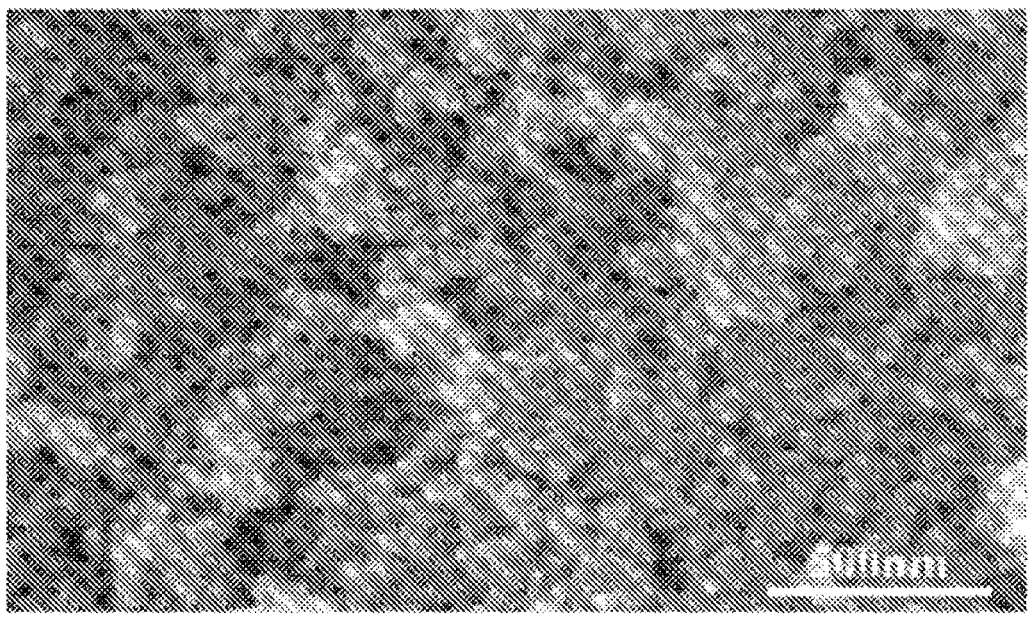
FIG. 12 SEM photograph of the silica aerogel in example 13.
Figure 13:
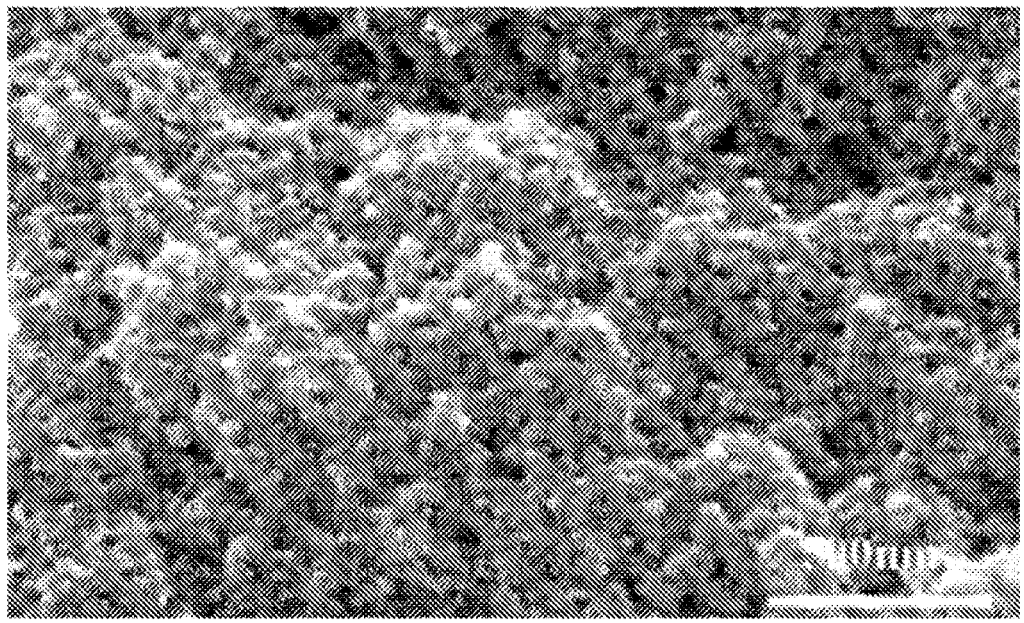
FIG. 13 SEM photograph of the silica aerogel in example 14.
Figure 14:
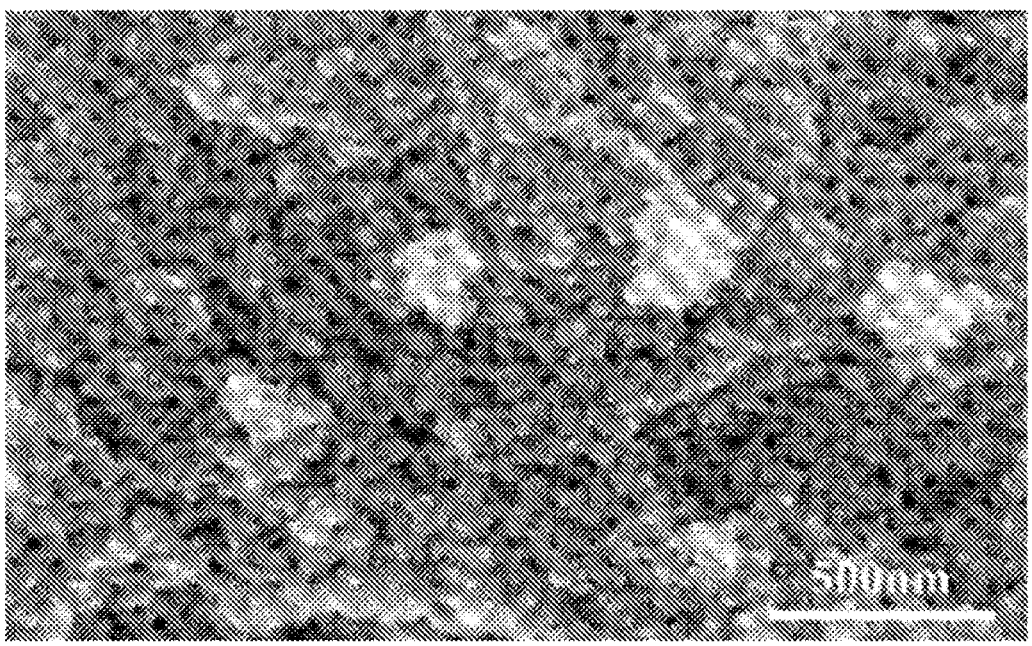
FIG. 14 SEM photograph of the silica aerogel in example 15.
Figure 15:
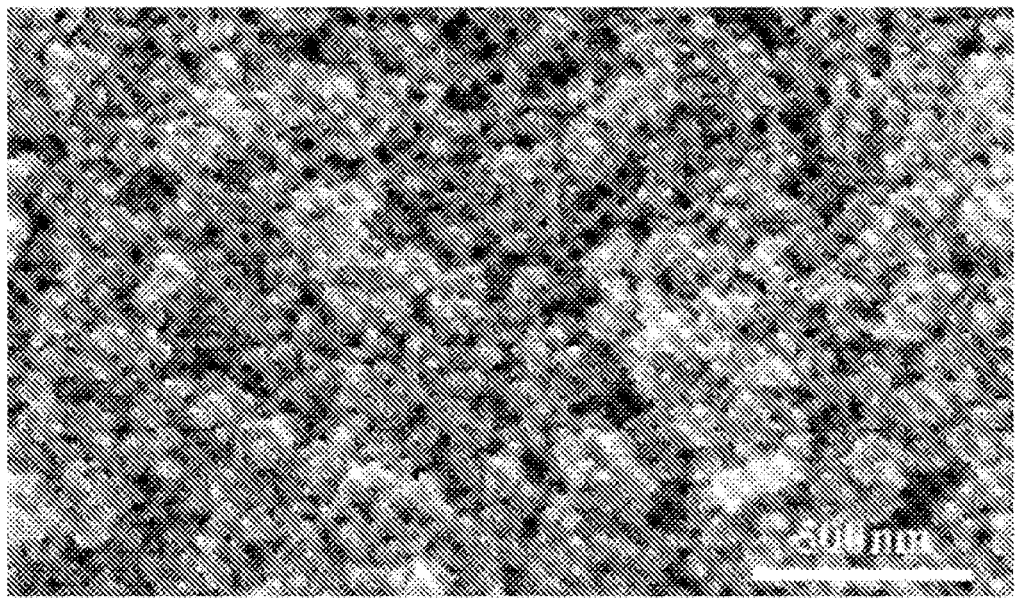
FIG. 15 SEM photograph of the silica aerogel in example 16.
Figure 16:
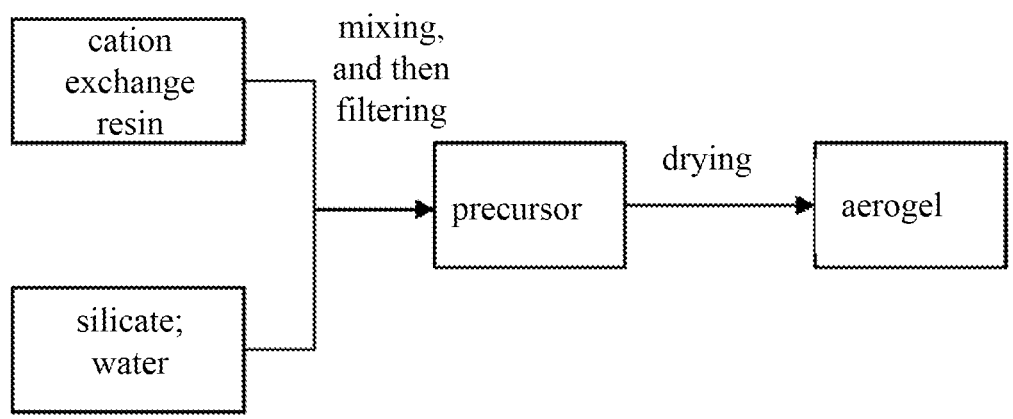
FIG. 16 Flow diagram for the improved Embodiment 4.

The silica aerogel powders obtained from examples 4-6 and 13-16 were observed under scanning electron microscope, and their SEM were obtained, see FIGS. 9-15 (500 nm).

FIGS. 9-15 are the SEMs of the samples corresponding to examples 4-6 and examples 13-16, respectively. It can be seen that there are porous structures in all samples. It can be seen from FIGS. 11 and 12, the porous are evenly distributed, and there are no agglomeration. A three-dimensional porous structure is formed for all samples.

The specific surface area, porosity and thermal conductivity of aerogels obtained from examples 1-16 were measured. The results are shown in the following table.

TABLE

Performance Measurements

| Item | Specific surface area/(m²/g) | Porosity | Thermal conductivity/(w/mk) |
|---|---|---|---|
| Example 1 | 800 | 95% | 0.019 |
| Example 2 | 850 | 95% | 0.018 |
| Example 3 | 820 | 95% | 0.019 |
| Example 4 | 950 | 95% | 0.012 |
| Example 5 | 860 | 96% | 0.015 |
| Example 6 | 870 | 95% | 0.014 |
| Example 7 | 500 | 87% | 0.025 |
| Example 8 | 839 | 92% | 0.018 |
| Example 9 | 856 | 93% | 0.016 |
| Example 10 | 900 | 92% | 0.013 |
| Example 11 | 800 | 91% | 0.015 |
| Example 12 | 700 | 90% | 0.016 |
| Example 13 | 920 | 95% | 0.013 |
| Example 14 | 900 | 95% | 0.013 |

TABLE-continued

Performance Measurements

| Item | Specific surface area/(m²/g) | Porosity | Thermal conductivity/(w/mk) |
| --- | --- | --- | --- |
| Example 15 | 870 | 96% | 0.016 |
| Example 16 | 900 | 95% | 0.012 |

The invention claimed is:

1. A method for preparing a silica aerogel, comprising the following steps:
   A) mixing silicon phosphate and sodium silicate in a closed container, after that adding water into the closed container to dissolve to get a solution A, then adding a gel core particle into the solution A in the closed container to get a precursor; the gel core particle is selected from one or more of white carbon black and silica powder;
   B) drying the precursor to obtain the silica aerogel.

2. The method according to claim 1, wherein, a mass ratio of the silicon phosphate to the sodium silicate is (1-100):100; a mass ratio of the gel core particle to the sodium silicate is (1-50):100.

3. The method according to claim 1, wherein, a mass ratio of the silicon phosphate to the sodium silicate is (5-50):100.

4. The method according to claim 1, wherein, a mass ratio of the gel core particle to the sodium silicate is (5-20):100.

5. The method according to claim 1, further comprising performing an atomized drying or a natural drying to dry the precursor to obtain the silica aerogel.

6. The method according to claim 1, further comprising performing an atomized drying at a temperature of 200-500° C. to dry the precursor to obtain the silica aerogel.

7. The method according to claim 1, further comprising performing a natural drying at room temperature to dry the precursor to obtain the silica aerogel.

8. A method for preparing a silica aerogel, comprising the following steps:
   (1) mixing silicon polyphosphate and sodium silicate in a closed container, after that adding water into the closed container to dissolve to get a solution A, then adding a gel core particle into the solution A in the closed container to get a precursor; the gel core particle is selected from one or more of white carbon black and silica powder;
   (2) drying the precursor to obtain a silica aerogel.

9. A method for preparing a silica aerogel, comprising the following steps:
   (1) mixing silicon polyphosphate, silicon phosphate and sodium silicate in a closed container, after that adding water into the closed container to dissolve to get a solution A, then adding a gel core particle into the solution A in the closed container to get a precursor; the gel core particle is selected from one or more of white carbon black and silica powder;
   (2) drying the precursor to obtain a silica aerogel.

* * * * *